(12) United States Patent
Nunnink et al.

(10) Patent No.: US 9,036,929 B2
(45) Date of Patent: *May 19, 2015

(54) METHOD AND APPARATUS FOR HIGH RESOLUTION DECODING OF ENCODED SYMBOLS

(75) Inventors: Laurens Nunnink, Simpelveld (NL); William H. Equitz, Brookline, MA (US)

(73) Assignee: Cognex Technology and Investment LLC, Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/608,692

(22) Filed: Sep. 10, 2012

(65) Prior Publication Data

US 2013/0062411 A1    Mar. 14, 2013

Related U.S. Application Data

(63) Continuation of application No. 12/505,077, filed on Jul. 17, 2009, now Pat. No. 8,265,404, which is a continuation of application No. 10/911,209, filed on Aug. 4, 2004, now abandoned.

(51) Int. Cl.
G06K 9/36     (2006.01)
G06K 7/14     (2006.01)

(52) U.S. Cl.
CPC ........................................ *G06K 7/14* (2013.01)

(58) Field of Classification Search
USPC ............................ 382/233; 235/462.1, 462.07
See application file for complete search history.

(56) References Cited

U.S. PATENT DOCUMENTS

| | | |
|---|---|---|
| 3,868,634 A | 2/1975 | Dolch |
| 3,890,597 A | 6/1975 | Hanchett |
| 4,282,425 A | 8/1981 | Chadima et al. |
| 4,308,455 A | 12/1981 | Bullis et al. |
| 4,421,978 A | 12/1983 | Laurer et al. |
| 4,782,220 A | 11/1988 | Shuren |
| 4,866,784 A | 9/1989 | Barski |
| 4,894,523 A | 1/1990 | Chadima et al. |
| 4,948,955 A | 8/1990 | Lee et al. |
| 4,973,829 A | 11/1990 | Ishida et al. |
| 5,028,772 A | 7/1991 | Lapinski et al. |
| 5,120,940 A | 6/1992 | Willsie |
| 5,124,537 A | 6/1992 | Chandler et al. |
| 5,124,538 A | 6/1992 | Lapinski et al. |
| 5,155,343 A | 10/1992 | Chandler |
| 5,166,830 A | 11/1992 | Ishibai et al. |
| 5,187,355 A | 2/1993 | Chadima et al. |
| 5,187,356 A | 2/1993 | Chadima et al. |
| 5,192,856 A | 3/1993 | Schaham et al. |
| 5,262,623 A | 11/1993 | Batterman et al. |
| 5,262,625 A | 11/1993 | Tom et al. |
| 5,276,315 A | 1/1994 | Surka |

(Continued)

FOREIGN PATENT DOCUMENTS

WO    WO-2006019847    2/2006

*Primary Examiner* — John Strege
(74) *Attorney, Agent, or Firm* — Quarles & Brady LLP

(57) ABSTRACT

A method for scanning and decoding encoded symbols comprises processing low resolution image data from a full field of view and/or high resolution image data from one or more windowed segments of the field of view to provide imaging that is easily adaptable to different types of symbols and varying environmental conditions. The scanning method can be switched between the low resolution mode and the high resolution mode automatically based on whether the low resolution data is sufficiently accurate to decode the symbol.

7 Claims, 9 Drawing Sheets

(56) References Cited

U.S. PATENT DOCUMENTS

| | | |
|---|---|---|
| 5,276,316 A | 1/1994 | Blanford |
| 5,278,397 A | 1/1994 | Barkan et al. |
| 5,291,008 A | 3/1994 | Havens et al. |
| 5,296,690 A | 3/1994 | Chandler et al. |
| 5,304,786 A | 4/1994 | Pavlidis et al. |
| 5,332,892 A | 7/1994 | Li et al. |
| 5,378,883 A | 1/1995 | Batterman et al. |
| 5,418,357 A | 5/1995 | Inoue et al. |
| 5,418,862 A | 5/1995 | Zheng et al. |
| 5,446,271 A | 8/1995 | Cherry et al. |
| 5,455,414 A | 10/1995 | Wang |
| 5,461,417 A | 10/1995 | White et al. |
| 5,463,214 A | 10/1995 | Longacre, Jr. et al. |
| 5,478,999 A | 12/1995 | Figarella et al. |
| 5,481,098 A | 1/1996 | Davis et al. |
| 5,486,689 A | 1/1996 | Ackley |
| 5,487,115 A | 1/1996 | Surka |
| 5,507,527 A | 4/1996 | Tomioka et al. |
| 5,514,858 A | 5/1996 | Ackley |
| 5,523,552 A | 6/1996 | Shellhammer et al. |
| 5,539,191 A | 7/1996 | Ackley |
| 5,550,366 A | 8/1996 | Roustaei |
| 5,557,091 A | 9/1996 | Krummel |
| 5,591,956 A | 1/1997 | Longacre et al. |
| 5,612,524 A | 3/1997 | San't Anselmo et al. |
| 5,635,699 A | 6/1997 | Cherry et al. |
| 5,646,391 A | 7/1997 | Forbes et al. |
| 5,675,137 A | 10/1997 | Van Haagen et al. |
| 5,682,030 A | 10/1997 | Kubon |
| 5,691,527 A | 11/1997 | Hara et al. |
| 5,723,853 A | 3/1998 | Longacre, Jr. et al. |
| 5,739,518 A | 4/1998 | Wang |
| 5,744,790 A | 4/1998 | Li |
| 5,756,981 A | 5/1998 | Roustaei et al. |
| 5,767,498 A | 6/1998 | Heske, III et al. |
| 5,773,806 A | 6/1998 | Longacre, Jr. |
| 5,777,309 A | 7/1998 | Maltsev et al. |
| 5,814,827 A | 9/1998 | Katz |
| 5,821,520 A | 10/1998 | Mulla et al. |
| 5,825,006 A | 10/1998 | Longacre, Jr. et al. |
| 5,852,288 A | 12/1998 | Nakazawa et al. |
| 5,877,486 A | 3/1999 | Maltsev et al. |
| 5,889,270 A | 3/1999 | Van Haagen et al. |
| 5,900,613 A | 5/1999 | Koziol et al. |
| 5,902,988 A | 5/1999 | Durbin |
| 5,914,476 A | 6/1999 | Gerst, III et al. |
| 5,920,060 A | 7/1999 | Marom |
| 5,932,862 A | 8/1999 | Hussey et al. |
| 5,936,224 A | 8/1999 | Shimizu et al. |
| 5,949,052 A | 9/1999 | Longacre, Jr. et al. |
| 5,965,863 A | 10/1999 | Parker et al. |
| 6,000,612 A | 12/1999 | Xu |
| 6,021,946 A | 2/2000 | Hippenmeyer et al. |
| 6,046,773 A | 4/2000 | Martens et al. |
| 6,053,407 A | 4/2000 | Wang et al. |
| 6,056,198 A | 5/2000 | Rudeen et al. |
| 6,075,883 A | 6/2000 | Stern et al. |
| 6,082,619 A | 7/2000 | Ma et al. |
| 6,088,482 A | 7/2000 | He et al. |
| 6,095,422 A | 8/2000 | Ogami |
| 6,123,261 A | 9/2000 | Roustaei |
| 6,152,371 A | 11/2000 | Schwartz et al. |
| 6,158,661 A | 12/2000 | Chadima, Jr. et al. |
| 6,176,428 B1 | 1/2001 | Joseph et al. |
| 6,189,792 B1 | 2/2001 | Heske, III |
| 6,206,289 B1 | 3/2001 | Sharpe et al. |
| 6,209,789 B1 | 4/2001 | Amundsen et al. |
| 6,234,395 B1 | 5/2001 | Chadima, Jr. et al. |
| 6,234,397 B1 | 5/2001 | He et al. |
| 6,250,551 B1 | 6/2001 | He et al. |
| 6,298,176 B2 | 10/2001 | Longacre, Jr. et al. |
| 6,333,949 B1 | 12/2001 | Nakagawa et al. |
| 6,340,119 B2 | 1/2002 | He et al. |
| 6,371,373 B1 | 4/2002 | Ma et al. |
| 6,393,152 B2 | 5/2002 | Takahashi et al. |
| 6,398,113 B1 | 6/2002 | Heske, III |
| 6,405,925 B2 | 6/2002 | He et al. |
| 6,454,168 B1 | 9/2002 | Brandt et al. |
| 6,490,376 B1 | 12/2002 | Au et al. |
| 6,491,223 B1 | 12/2002 | Longacre, Jr. et al. |
| 6,505,778 B1 | 1/2003 | Reddersen et al. |
| 6,513,714 B1 | 2/2003 | Davis et al. |
| 6,513,715 B2 | 2/2003 | Heske, III et al. |
| 7,059,525 B2 | 6/2006 | Longacre et al. |
| 7,077,317 B2 | 7/2006 | Longacre et al. |
| 7,077,321 B2 | 7/2006 | Longacre et al. |
| 7,080,786 B2 | 7/2006 | Longacre, Jr. et al. |
| 7,147,159 B2 | 12/2006 | Longacre, Jr. et al. |
| 7,275,694 B2 | 10/2007 | Longacre, Jr. |
| 7,387,253 B1 | 6/2008 | Parker et al. |
| 7,434,733 B2 * | 10/2008 | Barber et al. ............ 235/462.01 |
| 8,265,404 B2 * | 9/2012 | Nunnink et al. ............... 382/233 |
| 2002/0041712 A1 | 4/2002 | Roustaei et al. |
| 2002/0044689 A1 | 4/2002 | Roustaei et al. |
| 2004/0051909 A1 | 3/2004 | Curry et al. |
| 2004/0218210 A1 | 11/2004 | Shozaki et al. |
| 2004/0262394 A1 | 12/2004 | Longacre, Jr. et al. |
| 2005/0103846 A1 | 5/2005 | Zhu et al. |

* cited by examiner

METHOD AND APPARATUS FOR HIGH RESOLUTION DECODING OF ENCODED SYMBOLS

This application is a continuation of U.S. patent application Ser. No. 12/505,077, titled "Method and Apparatus for High Resolution Decoding of Encoded Symbols," filed on Jul. 17, 2009, which is a continuation of U.S. patent application Ser. No. 10/911,209, titled "Method and Apparatus for High Resolution Decoding of Encoded Symbols," filed Aug. 4, 2004, the entire contents of both are incorporated herein by reference.

BACKGROUND OF THE INVENTION

The present invention relates to scanning devices for decoding symbols, and more particularly to a method for decoding symbols using a high resolution image sensor.

Encoded symbols such as ID bar codes, 2D bar codes and symbols, such as data matrixes, are commonly found in retail, industrial, and other applications for identifying labeled goods, products, or components. Bar codes are symbols that comprise a series of alternating white and black elongated bars or modules which are aligned to define a code. Data matrixes comprise a plurality of black and white cells which are arranged in a two dimensional code. Both of these types of codes, as well as various other symbols known in the art, can be found in applications for identifying goods, applied either to a label or printed directly on a part or component.

Devices for reading encoded symbols typically employ an illumination device for shining light on the symbol and a camera module for detecting the reflected light. The camera module typically has a fixed focal distance and a fixed aperture, providing a fixed field of view (FOV). The sensor in the camera module is arranged as an array of pixels defined by a row and column location in the sensor, and typically employs a low resolution sensor having a VGA resolution of about 640×480 pixels. In operation, the scanning device illuminates the symbol, and the camera module detects image data as reflected light from the illuminated area in the field of view. A decoding algorithm is employed to decode the symbol based on the acquired data.

The decoding algorithms used in these devices require a certain number of pixels per symbology element bar or cell for accurate decoding. When the FOV is fixed, as is typically found in current devices, there is therefore a direct relationship between the resolution of the sensor (in pixels per row/column) and the smallest readable code (measured in mm/module for bar codes and mm/cell for matrix codes). To provide the appropriate resolution, and both fast and accurate decode times for different types of symbols, readers are therefore typically specialized for a specific application and include lenses and/or focal distances which are fixed based on the expected application and the expected type of symbol to be read.

These specialized devices are useful for work stations where a single type of symbol is expected to be read under stable environmental conditions. However, it is often desirable to read different types of marks at a single station. To allow for reading of different types of symbols under varying environmental conditions, therefore, handheld readers are also available which use autofocus or bifocal lenses. These devices extend the reading range of the scanning device and therefore provide a variety of magnifications, thereby providing more versatile scanning capable at reading different types of symbols. Scanning devices including autofocus and bifocal lenses, however, can also be expensive and difficult to use. Autofocus and bifocal devices, for example, are highly dependent on the skill of the operator, as the operator must manually position the reader depending on the type of code being read. Furthermore, as the reader is moved further away, proper illumination of the symbol becomes problematic, rendering accurate reading difficult. These devices, therefore, require frequent re-positioning, are time-consuming to use, and can also be inaccurate.

BRIEF SUMMARY OF THE INVENTION

Figure 1:
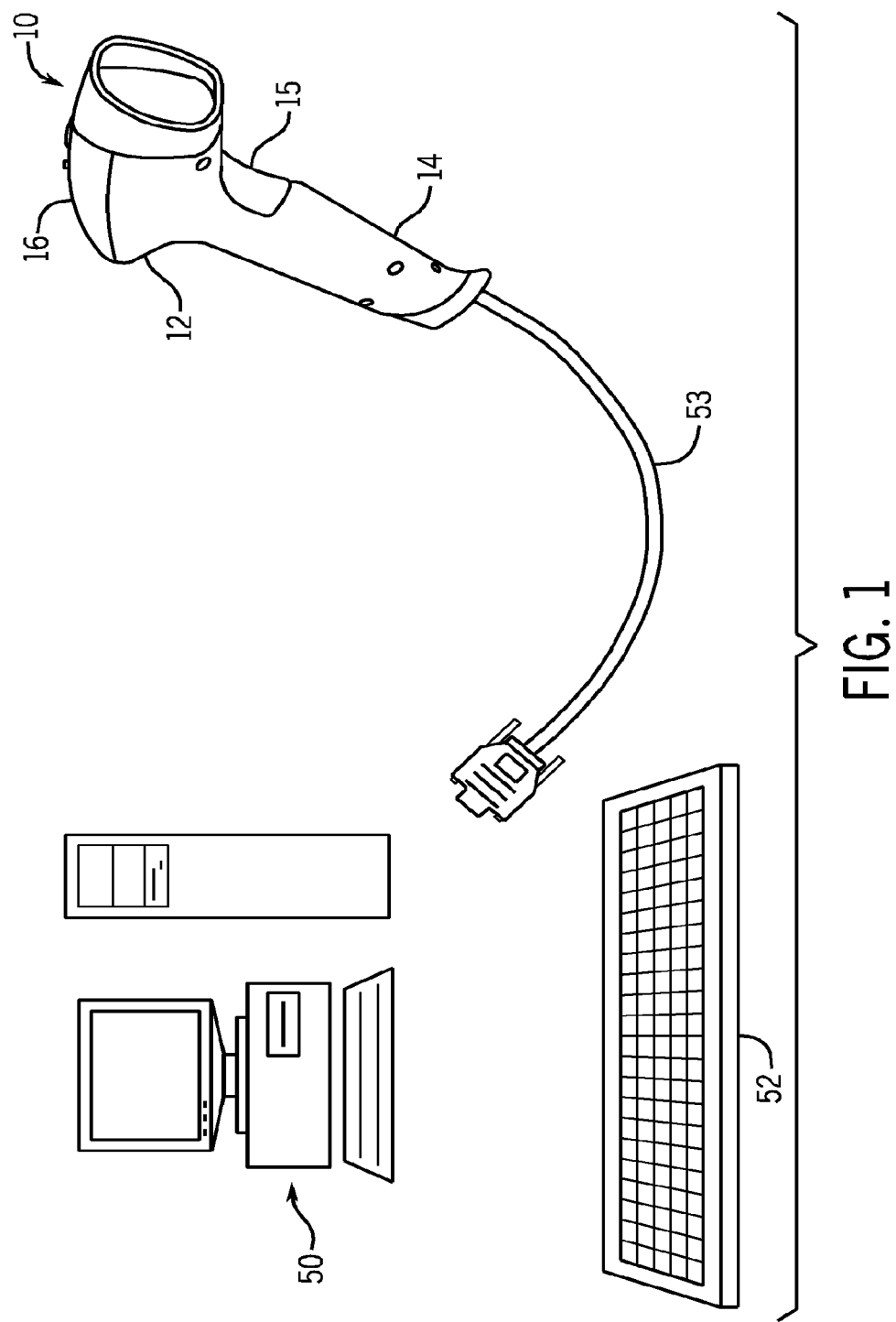
FIG. 1 is a perspective view of a scanning system including a scanning device and host computer.

In one aspect, the present invention provides a method for decoding an encoded digital symbol with a digital scanner which is useful for decoding various types of symbols in various environmental conditions. Initially, a low resolution image data set of a field of view including the symbol is acquired, and evaluated to attempt to decode the symbol. If the symbol is not decoded in the first step, a high resolution image data set of at least a portion of the field of view is acquired and, again, evaluated to determine if it can be decoded. If the symbol is again not decoded, additional high resolution image data sets of windowed portions of the field of view are acquired until the symbol is decoded.

In another aspect of the invention, a method for decoding an encoded digital symbol with a digital scanner is provided. Here, a high resolution image data set of a field of view of the scanner is acquired and stored. The data set is then sub-sampled and the resultant low resolution image data set is evaluated in an attempt to decode the symbol. If the decode attempt does not succeed, windowed portions of the high resolution image data set are selected and evaluated, windowing as appropriate until the symbol is decoded.

In yet another aspect of the invention, a digital scanner device is provided for decoding an encoded digital symbol. The scanner includes an illuminator for illuminating a field of view including the encoded digital symbol, a sensor comprising a plurality of pixels for detecting reflected light from the encoded digital symbol and to provide an electrical signal when light is detected, and a controller connected to the sensor to selectively read at least one of the pixels into an image data acquisition set. The controller is programmed to acquire a low resolution image data set by reading a subset of the pixels in the sensor distributed through the field of view, evaluate the low resolution image data set to decode the symbol, and, when the evaluation does not decode the symbol, to acquire a high resolution image data set by reading a full set of the pixels in a selected portion of the field of view. The high resolution image data set is then evaluated to decode the symbol and, when the evaluation of the high resolution image data set does not decode the symbol, reposition the selected portion of the field of view and acquiring and analyzing additional data sets until the symbol is decoded.

In still another aspect of the invention, a method for analyzing image data is provided. The method comprises the steps of analyzing a sub-sampled image data set of the field of view for a selected image parameter, and, if the image parameter is not found, analyzing a fully sampled portion of a certain field of view for the image parameter. If the image parameter is not found in the fully sampled portion, windowing through the data and analyzing a different fully sampled portion of the field of view for the image parameter until the parameter is identified.

In yet another aspect of the invention, a digital scanner for decoding symbols is provided including an image sensor comprising an array of pixels for imaging the symbol and a controller connected to the sensor to analyze image data acquired by the sensor. The controller is programmed to selectively acquire and decode low resolution image data comprising a sub-sampling of pixels in the field of view, acquire and decode high resolution image data comprising a full sampling of pixels in at least a portion of the field of view, acquire low resolution image data and switch to acquire high image resolution data when decoding of the low resolution image data fails.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE PREFERRED EMBODIMENT

Referring now to the figures and more particularly to FIG. 1, a handheld digital scanning device 10 useful for performing the present invention is shown. The digital scanning device 10 is provided in a housing 12 having a body section 16 and a grip section 14. The body section 16 provides illumination from a distal end to illuminate a symbol such as a bar code or data matrix, as described below. A moveable trigger 15 provided on the housing 12 is selectively activated by an operator to provide a start signal to an internal processor to illuminate and decode the symbol. A visual or audio indicator, such as an indicator light or buzzer, can also be provided to alert the user when a symbol has been decoded. Typically, the scanning device 10 is connected through a cable 53 to a host computer 50 which receives decode data.

Figure 2:
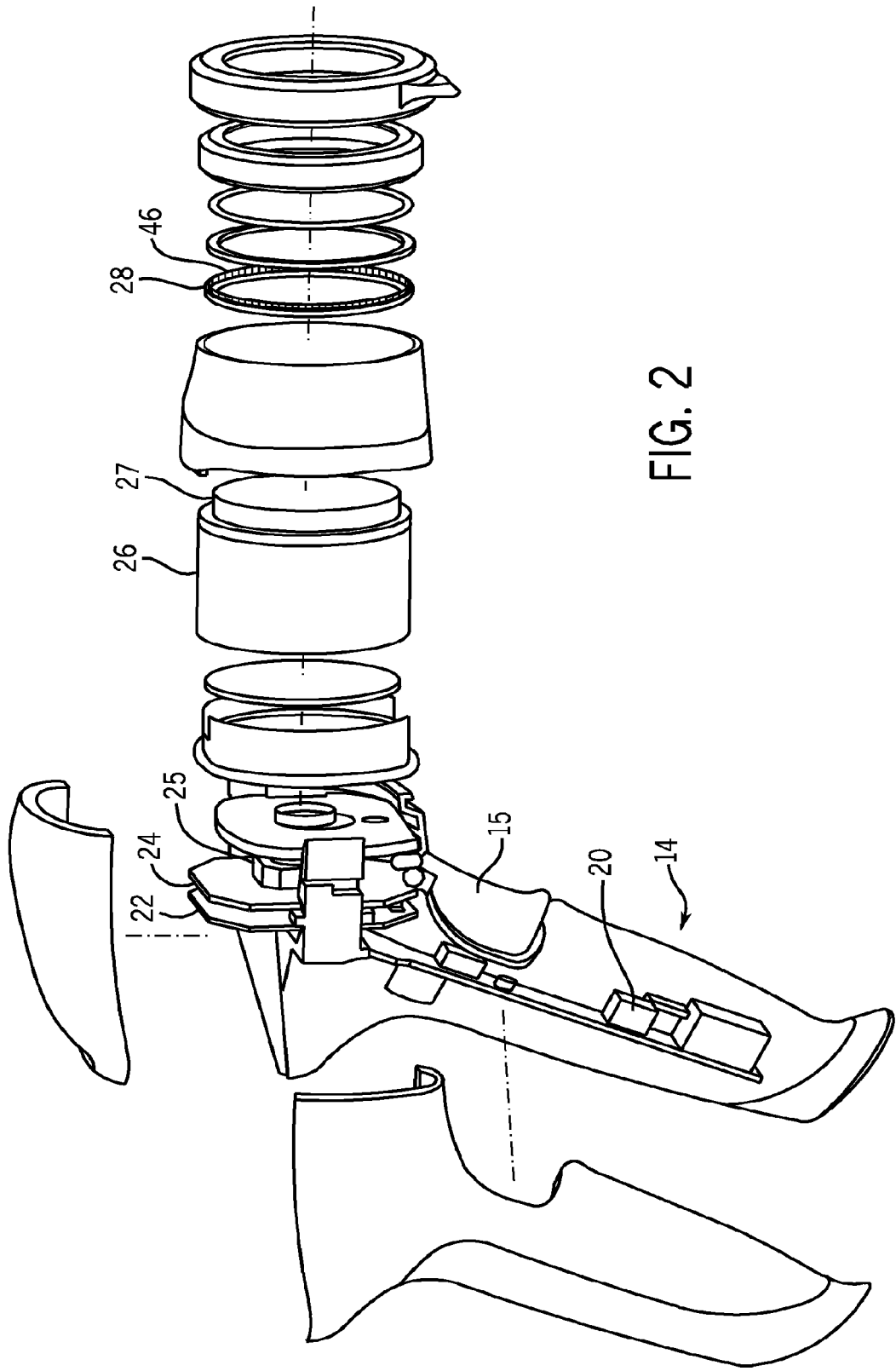
FIG. 2 is an exploded view of the scanning device of FIG. 1.

Referring now to FIG. 2, an exploded view of the digital scanning device 10 of FIG. 1 is shown. A power supply board 20 is provided in the grip section 14 and provides power to a CPU board 22, a camera or CAM board 24, and an illumination board 28 which are mounted in the body section 16 of the scanning device 10. An illumination pipe 26 is coupled between the CAM board 24 and the distal end of the body portion 16 of the digital scanner 10, and includes a recessed end 27 sized and dimensioned to receive the illumination board 28 which, as described more fully below, includes a plurality of lighting elements such as light emitting diodes or LEDs 46 arranged in a ringed configuration to provide dark field illumination. Although the illumination board 28 is shown arranged at the end of the illumination pipe 26, a "passive" illumination pipe 26, which receives light at a first end adjacent the CAM board 24 and transmits the light through the illumination pipe 26, can also be used, as described in co-pending application Ser. No. 10/693,626 filed Oct. 24, 2003 which is incorporated herein by reference for its description of such devices.

Figure 3:
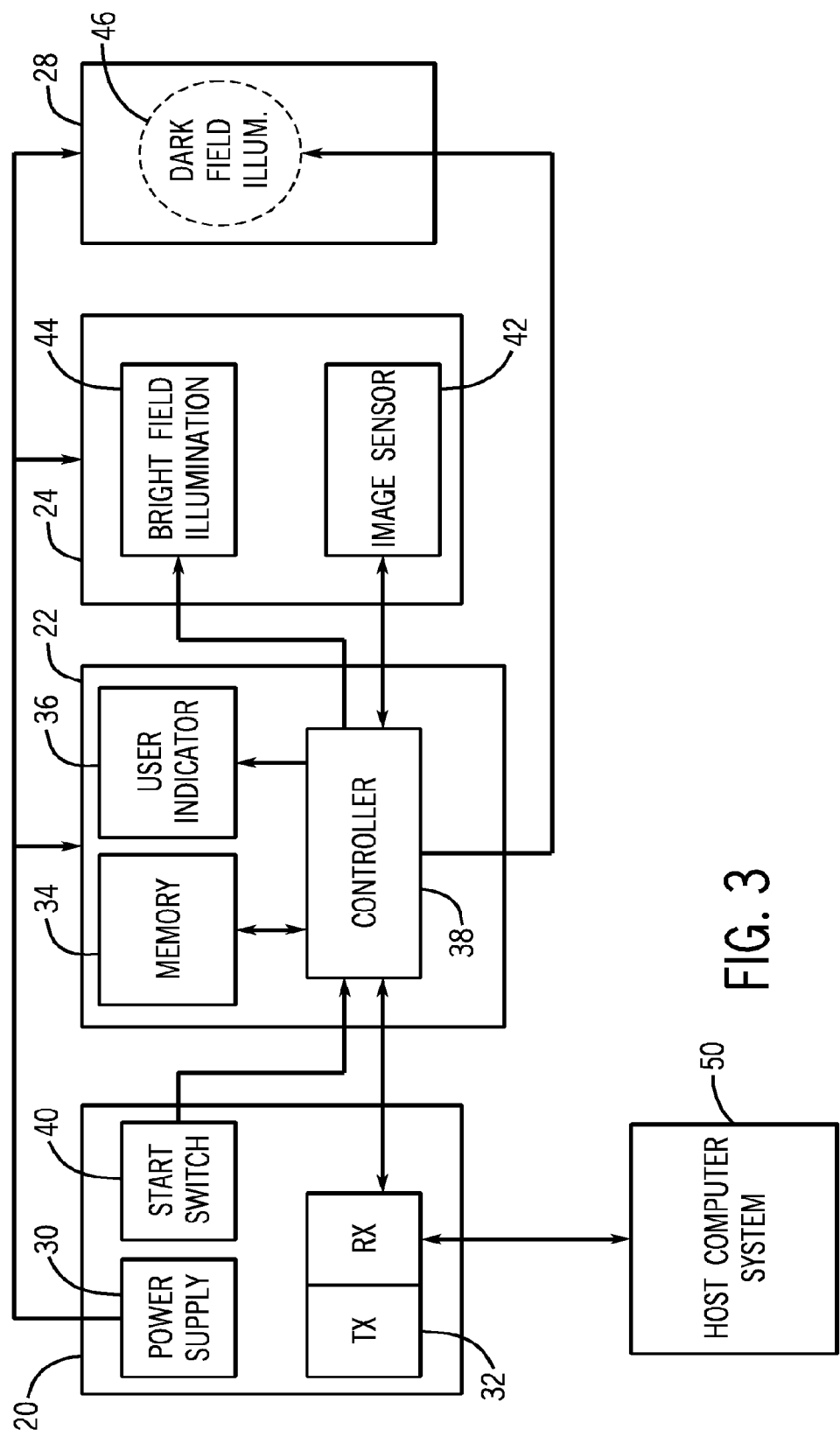
FIG. 3 is a block diagram of a control system for the scanning device of FIG. 2.

Referring now also to FIG. 3 the power supply board 20 includes a power supply 30 for providing logic level power to components in the scanner 10 including the CPU board 22, the CAM board 24, and the illumination PC board 28. As the power supply board 20 is provided in the grip portion 14 of the scanning device 10, a switching element 40 activatable by the trigger 15 (FIG. 1) is provided on the power supply board 20 for receiving a user-input signal requesting a scan. The power supply board 20 further includes a transmitter and receiver 32 for transmitting and receiving information from the host system 50 which, as described above, can be connected to the scanning device 10 to receive decode information from the digital scanning device 10, and to transmit data to the scanning device 10. The transmitter/receiver 32 can be any of a number of different types of communication devices including an RS 232 connection to the host system 50 or a PS2 connection which can be connected to a wedge between the keyboard 52 and the host system 50. Various other wired and wireless communication systems, which will be apparent to those of skill in the art, could also be used.

Referring still to FIG. 3, the central processing unit or CPU board 22 includes a microprocessor or controller 38, and a memory component 34 which can include both random access memory and read only memory. The controller 38 is connected to the memory component 34 for storing data to and retrieving data from memory, to the power supply board 30 for transmitting signals to and receiving signals from the host system 50 through the transmitter/receiver 32 and the receiving a start scan signal from the switch 40, to the CAM board 24 to receive acquired image data and to operate bright field illumination 44, as described below, and to the illumination PC board 28 for driving the light elements 46 to provide dark field illumination to a symbol to be scanned, also as described more fully below. Although direct connections are shown between the controller 38 and various other elements, it will be apparent that various I/O device, A/D converters, and other elements can also be provided for implementing communication between the various circuit boards.

Figure 4:
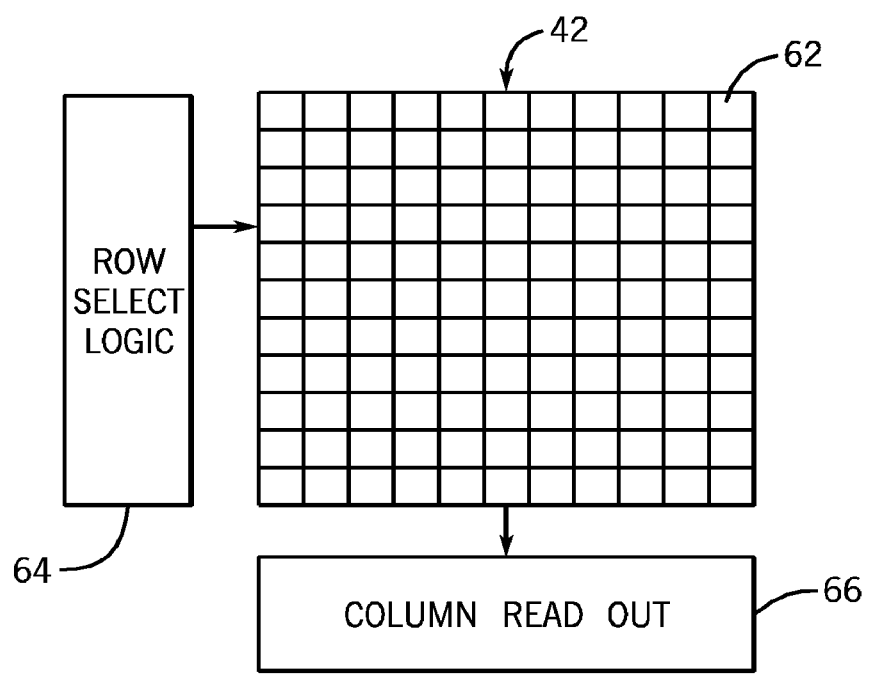
FIG. 4 is a simplified view of the image sensor of FIG. 3.

Referring still to FIG. 3 and also to FIG. 4, the CAM board 24 includes an image acquisition sensor 42 which detects light reflected from a symbol such as a barcode or a data matrix, along with a lens 25 and other optical elements. The image acquisition sensor 42 is a high resolution sensor, and preferably a CMOS sensor having a resolution of at least a 1280×1024 provided in an array of pixels 62 arranged in rows and columns. The sensor 42 can be provided on a single chip including row select logic 64 and a column readout device 66 which provides selective access to the individual pixels 62 within the array, and can also include acquisition hardware elements for selectively sub-sampling the array and windowing portions of the array. Although a number of suitable chips are commercially available, one image sensor component suitable in this application is the megapixel sensor sold as part number LM9638 from National Semiconductor of Santa Clara Calif. A bright field illumination element 44, such as an LED, can also be provided on the CAM board 24 and can be activated by the controller 38 independently of or in conjunction with the dark field illumination 46 provided on the illumination board 28.

Referring again to FIGS. 2 and 3, as described above, the illumination PC board 28 includes a plurality of light emitting diodes or LEDs 46 arranged in a ring configuration which, as shown, is circular. The LEDs 46 are connected to the power supply 20 and to the CPU board 22 such that the controller 38 can selectively control the LEDs 46, either individually, as a group, or in connected segments, to provide illumination from the scanning device 10. Although a circular ring array is shown here, the light elements provided in the illumination PC board 28 can be arranged in various configurations, and the term ring is intended to include various polygonal, rectangular, square, oval, and other configurations.

Referring again to FIG. 4, a simplified schematic illustration of an image acquisition sensor 42 is shown. As described above, the image acquisition sensor 42 comprises an array of pixels 62 which are arranged in a row and column configuration and which are selectively accessible by controller 38 (FIG. 3) through row select logic 64 and a column readout 66. A full field of view (FOV) typically includes all of the pixels 62 in the array of the image sensor 42. As described below, various portions of the image acquisition sensor 42 array can be accessed and individually read out thereby providing the ability to select various portions of the array for imaging.

Referring again to FIGS. 2, 3, and 4, in operation, the trigger 15 on the scanning device 10 is activated by a user, activating the switch 40 on the power supply board 20, and providing a control signal to the controller 38 to activate at least a portion of the LEDs 46 on the illumination board 28 and/or the bright field illumination 44 to illuminate a symbol to be decoded. Reflected light from the symbol is detected by the image acquisition sensor 42 on the CAM board 24, which has a fixed lens to provide a fixed focal distance. Image data acquired by the sensor 42 is read out by the controller 38, and can be processed or stored in the memory component 34 as a series of pixels 62. In accordance with the present invention image data from the high resolution sensor 42 is acquired or processed using subsets of pixels to provide improved processing speeds. These subsets can be, as described below, sub-sampled portions of the FOV in which a portion of the available pixels across the FOV are sampled, or windowed higher resolution data sets including all of the pixels acquired in a segment or portion of the FOV. By selectively processing reduced sets of data, high speed acquisition and decoding of image data can be achieved, and the scanning device can automatically adjust for varying symbology and environmental condition.

Figure 8:
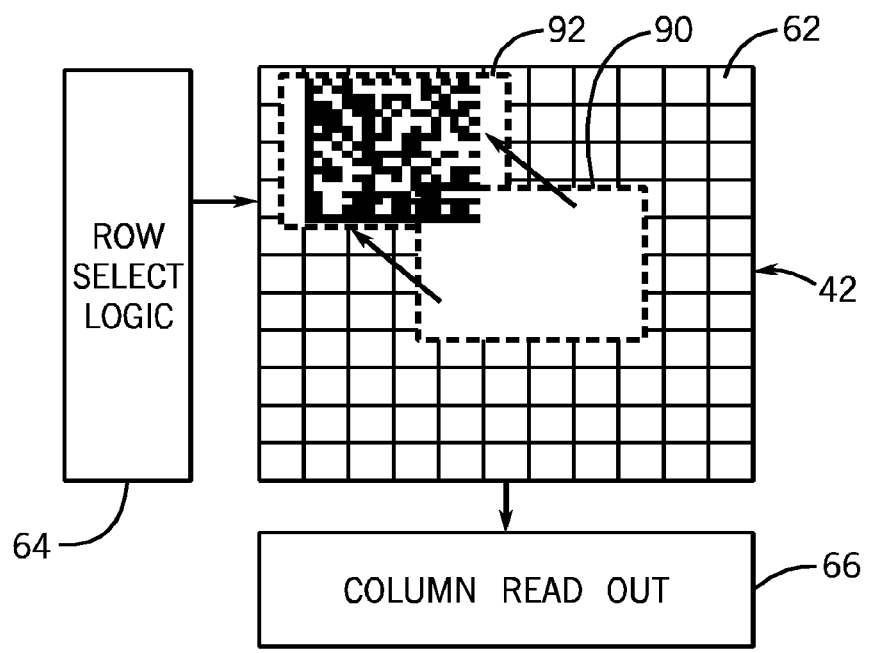
FIG. 8 is a view of the sensor of FIG. 4 illustrating windowing for a high resolution data set including all of the pixels in a portion of the field of view.

To provide a full range of capabilities, the digital scanning device 10 can, in some applications, be selectively operated in each of a low resolution mode, in which acquired data is sub-sampled over the entire FOV as described above, in a high resolution mode, in which acquired data is fully sampled over a portion of the field of view and subsequent acquisitions "window" through the field of view, and an automatic switching mode, as described with reference to FIGS. 5 and 8, below. Switching between the various modes can be provided, for example, by activating the trigger 15 repeatedly within a predetermined period of time, by adding an additional single position or multi-position switch to the scanning device 10, by selecting a mode from the keyboard 52 of the host computer 50, or in various other ways which will be apparent to those of skill in the art. Although a high resolution mode is described as employing a windowing process, a high resolution image could also be acquired for all of the pixels in the FOV.

Figure 5:
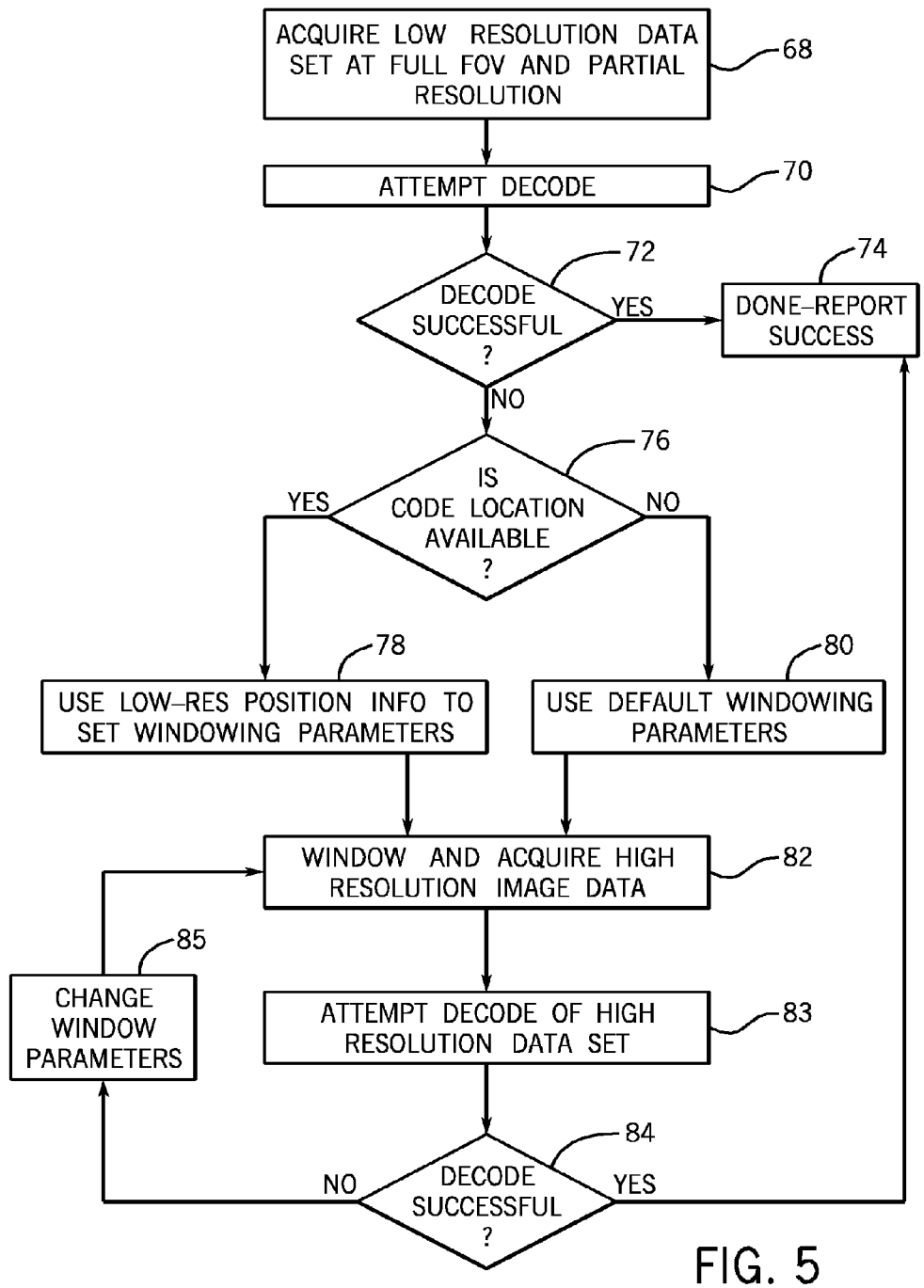
FIG. 5 is a flow chart illustrating the steps for decoding a symbol in accordance with one embodiment of the invention.
Figure 6:
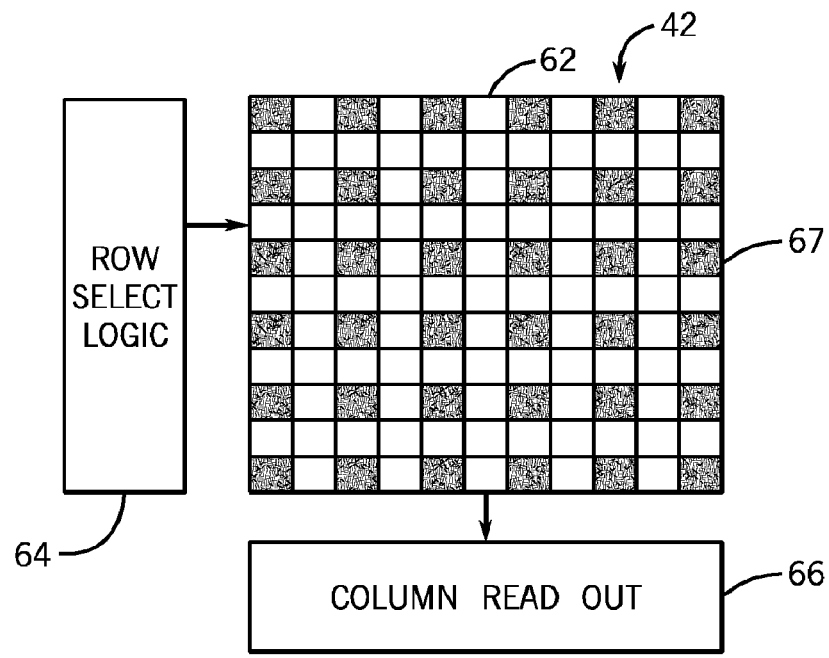
FIG. 6 is a view of the simplified image sensor of FIG. 4 illustrating a low resolution image acquisition of a partial read of the full field of view.

Referring now to FIG. 5, one embodiment of a method for decoding the symbol in accordance with the present invention using automatic switching between low resolution and high resolution modes is shown. Here, after the trigger 15 is activated the initial set of image data acquired is a low resolution image data set in which the pixels 62 are sub-sampled such that data is acquired from a subset of the available pixels. The subset can include, for example, image data acquired from reading every other row and column of the array, as shown in FIG. 6 where the dark pixels 67 represent sampled pixels (step 68). The first low image resolution data set therefore includes image data for the full field of view (FOV) but sampled at partial, typically half resolution, providing a large but lower resolution image than would be available if data were acquired from all the pixels 62 in the image sensor 42. The half resolution image data set comprises each pixel that is read, a scan of both in every other row and every other column, resulting in a set of pixels which is one fourth cut the total number of pixels in the image.

Figure 7:
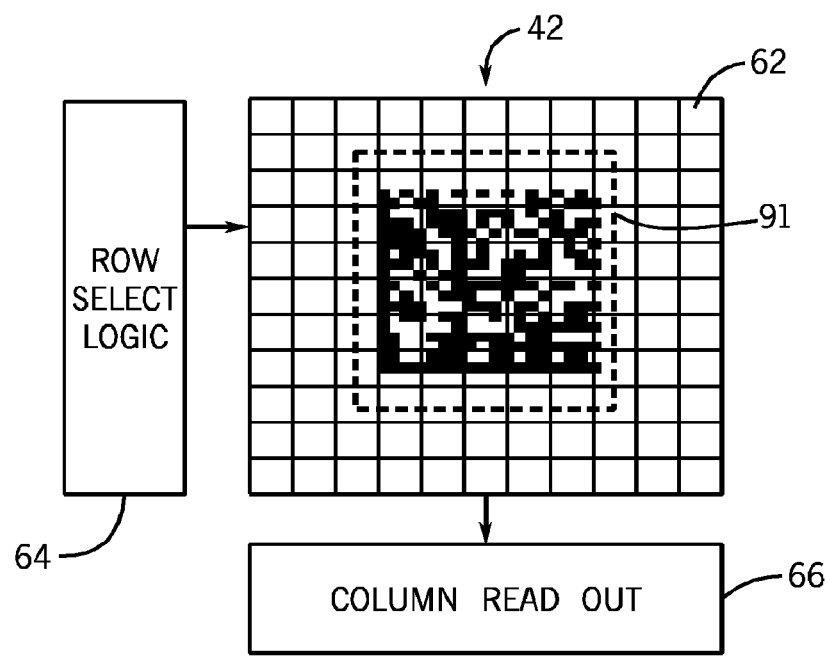
FIG. 7 is a view of the simplified image sensor of FIG. 4 illustrating windowing based on a finder pattern.

In step 70, the controller 38 in CPU board 24 attempts to decode the low resolution image data set by applying a decode algorithm. In step 72 a determination is made as to whether the decode of the low resolution image data set has been successful. If the decode is successful, the process is complete, the CPU board 24 activates an indicator 36 indicating that a decode has been completed, and can also transmit decode data to the host system 50 (step 74). If the decode is not successful, the low resolution image data set is evaluated to determine whether a finder pattern or code, which provides symbol location information to the scanner can be located within the symbol being analyzed (step 76). If so, the finder pattern is used to set windowing parameters (step 78) for acquiring additional high resolution image data sets of the symbol which are smaller in size than the FOV, but which include most and preferably all, of the pixels 62 in at least a portion of the sensor 42, as shown schematically in FIG. 7. Here, the symbol is a data matrix having a finder pattern of a solid line along the left side and bottom of the symbol and the window 91 is positioned around the symbol.

If a finder pattern is not available, in step 80 default windowing parameters for selecting an initial the location for acquiring "windowed" high resolution image data is instituted. Referring now to FIG. 8, using these default parameters, for example, windowing will typically begin in the center 90 of the sensor 42 and continue to a second location 92 based on data acquired from the first window 90, which can include, as described above, a finder pattern for locating successive windows, a default set of windowing parameters, or identifying a portion of the symbol which allows repositioning of the window to the second location 92. Using any of these methods, the controller 38 attempts to zoom in on the symbol, and to decode the symbol using the acquired high resolution images, windowing through the FOV as appropriate in step 82, attempting to decode the symbol in step 83, changing the windowing parameters in step 85 until the image is decoded in step 84. When the symbol is decoded, the controller 38 again activates a user indicator to provide an indication to the operator that the symbol has been decoded, and/or downloads decode data to the host system 50.

Figure 9:
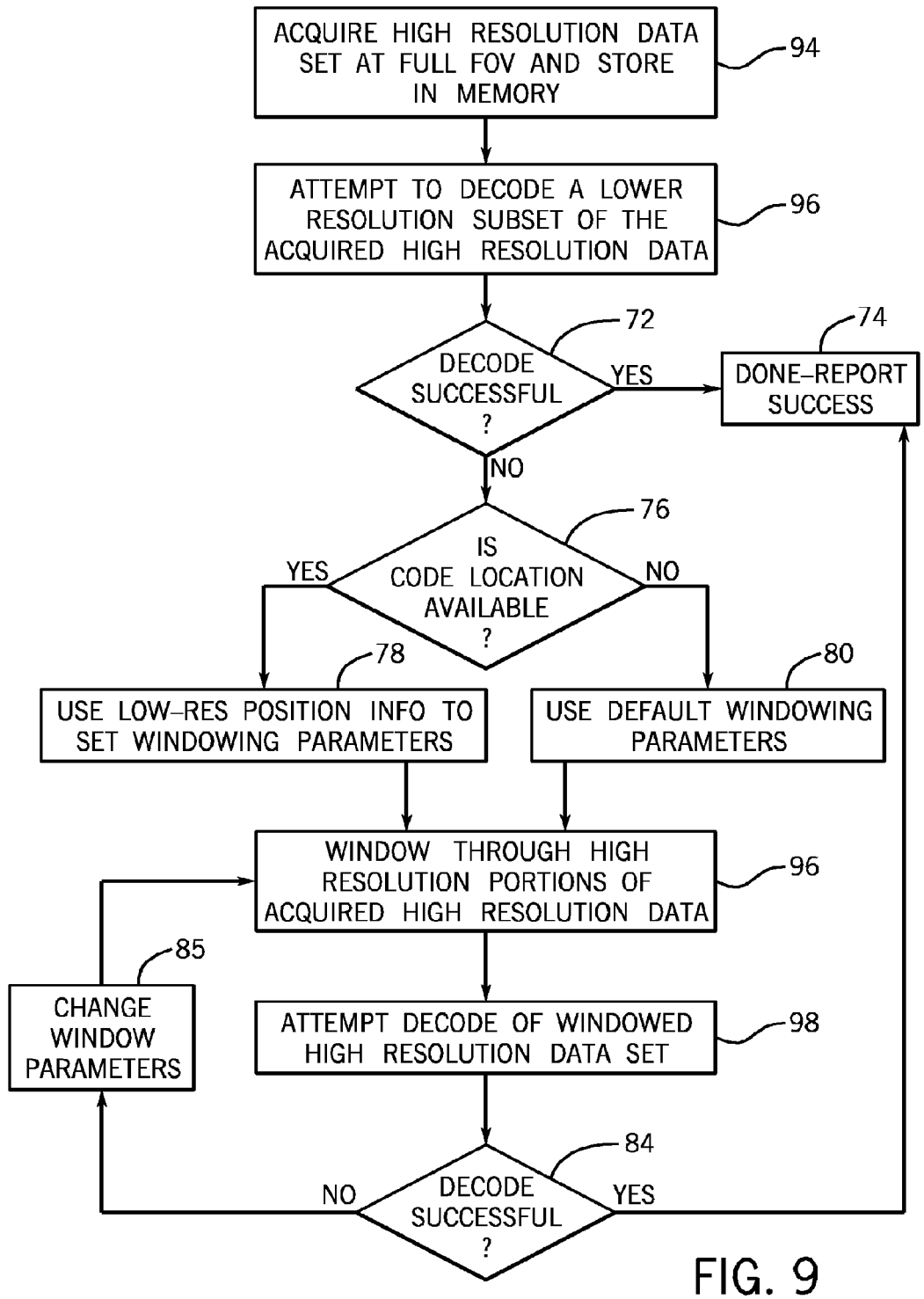
FIG. 9 is a flow chart illustrating a second embodiment of the invention.

Referring now to FIG. 9, a flow chart illustrating a second embodiment of the invention is shown, in which identical steps to those described above with reference to FIG. 5 are given like numbers. Here, a high resolution data set is initially acquired for the entire FOV in step 94. This high resolution image data set is stored in memory. The controller 38 initially retrieves a low resolution subset of the acquired data (step 96) which can be, for example, every other pixel 67 or alternate rows and columns of pixel data, as described above with respect to steps 72-80. If decode is not successful, processing continues by retrieving and windowing through high resolution sets of data (steps 85, 96 and 98), and processing of the data then continues as described above. Here, rather than acquiring successive sets of image data through hardware, as described above, sampling and windowing of the data is a software function.

The present invention therefore provides a scanning device which is capable of consistently reading a variety of symbols in a variety of environmental conditions without the need for the operator to adjust to either the symbol being scanned or the surrounding conditions. By employing a higher resolution sensor and processing smaller or lower resolution portions of the available pixels, the invention also provides fast processing of the data, particularly when the reduced image contains all the information needed to decode the symbol.

Figure 10:
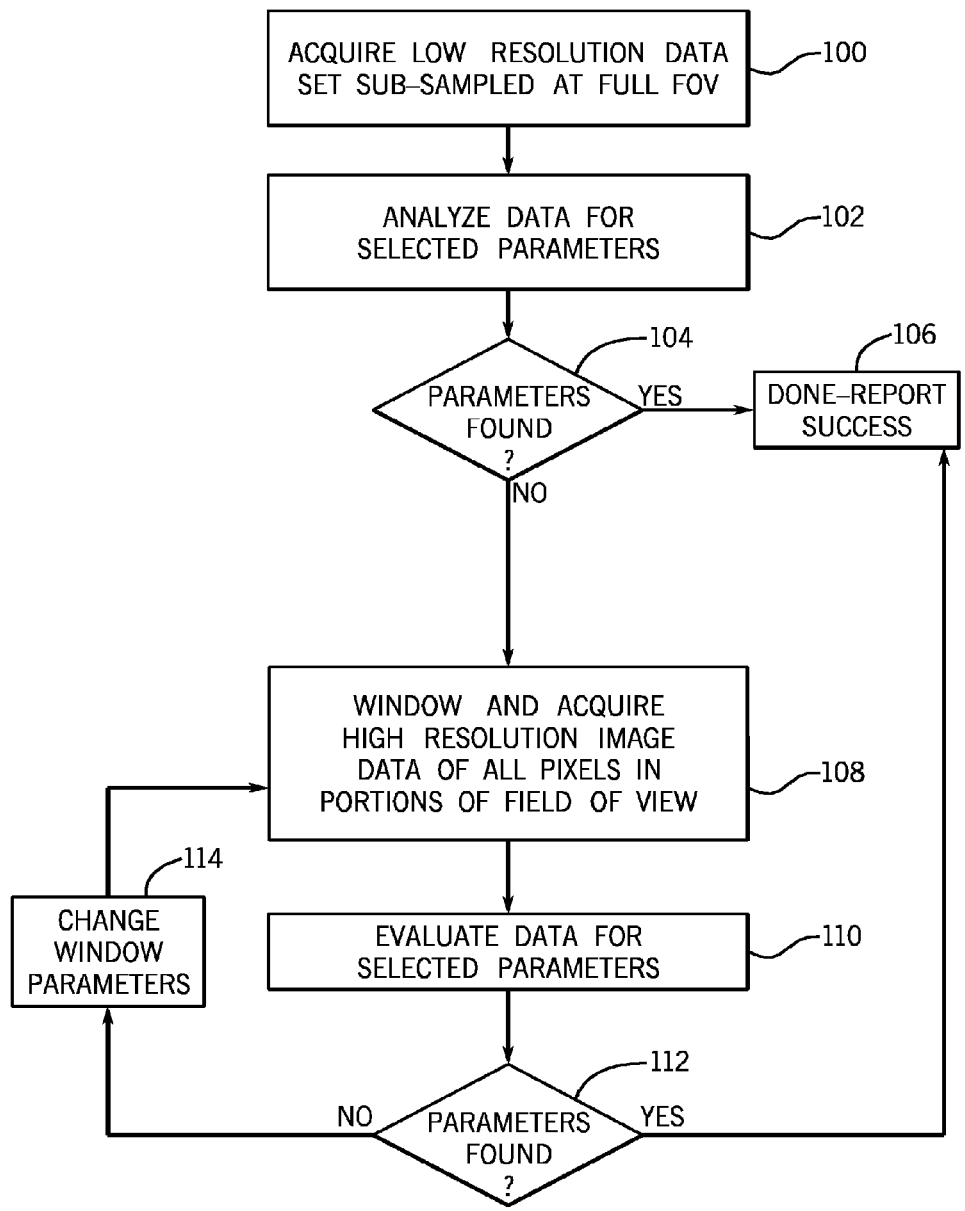
FIG. 10 is a flow chart illustrating a third embodiment of the invention.

Referring now to FIG. 10, although the invention is described specifically above for use in decoding symbols, similar methods can be used for any type of image data for which imaging parameters can be defined and evaluated. Here, for example, a first low resolution image set comprising sub-sampled data over the FOV is acquired in step 100, and then analyzed for a selected parameter in step 102. If the parameter is found, the process is complete, and an indication of success can be provided (step 106). If the parameter cannot be found in the image data acquired, high resolutions images of windowed portions of the FOV re acquired (step 108), evaluated for the parameter (step 110), changing the window field of view (step 114) until the process is successful (step 112) or, in the alternative, until all of the data has been imaged at a high resolution. In alternate embodiments, successive sub-sampled, full FOV images could be acquired at varying levels of sampling, including, for example, a first step at a resolution of one quarter of the pixels, a second step at a resolution of one third of the pixels, and a third step at a resolution of half of the pixels. Similarly, windowing could be provided for successively larger or smaller portions of the FOV, or at successively increased sampling levels.

Therefore, although specific embodiments have been shown and described, it will be apparent that a number of variations could be made within the scope of the invention. For example, although a handheld scanner with specific hardware configuration has been described above, it will be apparent to those of ordinary skill in the art that many variations could be provided in the hardware and software described. Additionally, a fixed mount scanning device could also be used. Furthermore, although specific lighting conditions and symbols have been described, these are not considered to be limitations of the invention, as the methods described herein could be employed in various applications, as will be apparent from the description above. Additionally, although the method has been described above for use in decoding symbols, it will be apparent that similar methods can also be used in several imaging applications. It should be understood therefore that the methods and apparatuses described above are only exemplary and do not limit the scope of the invention, and that various modifications could be made by those skilled in the art that would fall under the scope of the invention. To apprise the public of the scope of this invention, the following claims are made:

The invention claimed is:

1. A method for analyzing image data of an encoded symbol acquired with a digital scanner, comprising the following steps:
   (a) applying a decoding algorithm to analyze a sub-sampled image data set of a field of view of the digital scanner;
   (b) if the data set is not decoded in step (a), applying a decoding algorithm to analyze a fully sampled portion of the field of view of the digital scanner;
   (c) if the data set is not decoded in step (b), applying a decoding algorithm to analyze a different fully sampled portion of the field of view of the digital scanner; and
   (d) repeating steps (b) and (c) until the encoded symbol is decoded.

2. The method as defined in claim 1, wherein step (a) comprises analyzing a half sampled image data set of the field of view.

3. The method as defined in claim 1, wherein step (a) comprises acquiring a high resolution image data set for the field of view and storing the high resolution image data set for processing.

4. The method as defined in claim 1, wherein step (a) comprises acquiring a sub-sampled low resolution data set.

5. The method as defined in claim 1, wherein steps (b) and (c) comprise acquiring a windowed high resolution data set.

6. The method as defined in claim 1, wherein steps (a), (b), and (c) comprise evaluating the image data set to find a finder pattern in the encoded symbol.

7. The method as defined in claim 1, wherein step (a) comprises sub-sampling the image data set at successively increasing sampling levels.

* * * * *